Dec. 1, 1925.
A. E. CUTLER ET AL
1,563,612
ELECTRIC WELDING APPARATUS
Filed July 24, 1923
4 Sheets-Sheet 2
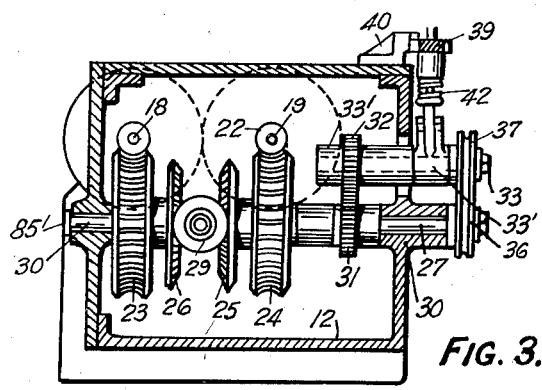
FIG. 3.
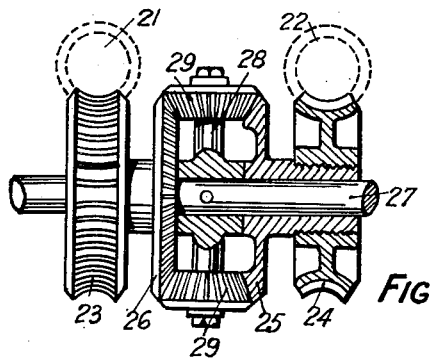
FIG. 4.
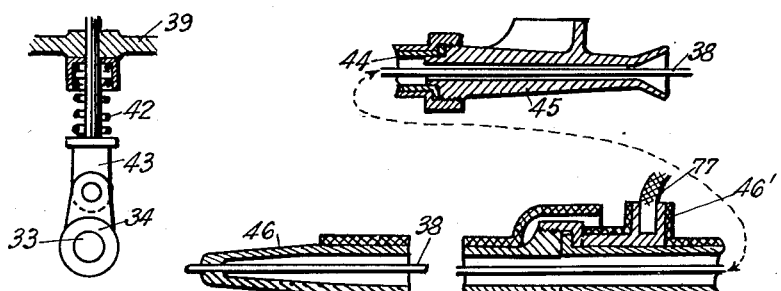
FIG. 5.
FIG. 6.
Inventors
Arthur Edward Cutler
Philip Allan Marsden
by Singer Atty

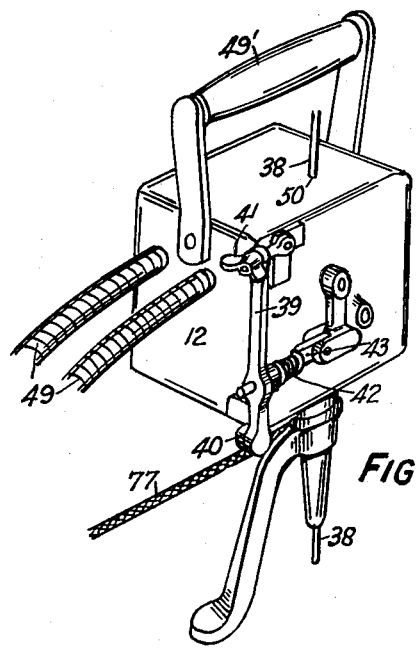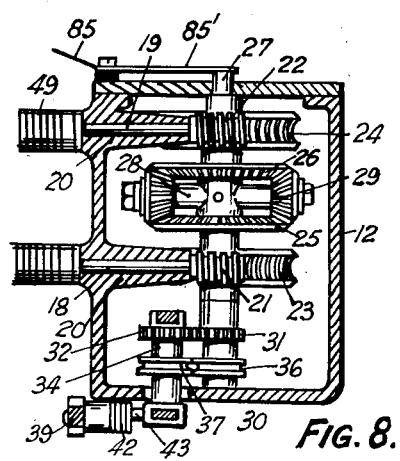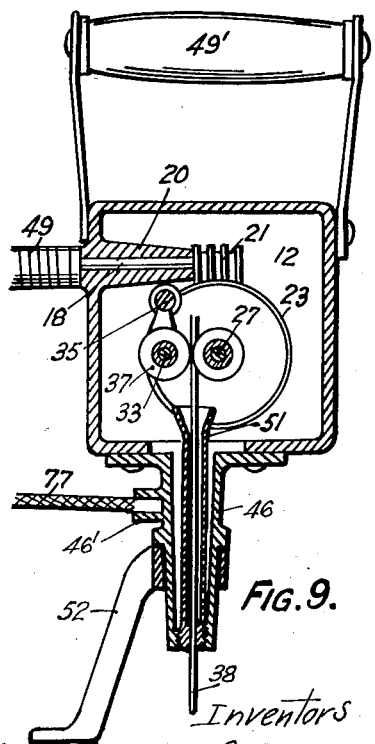

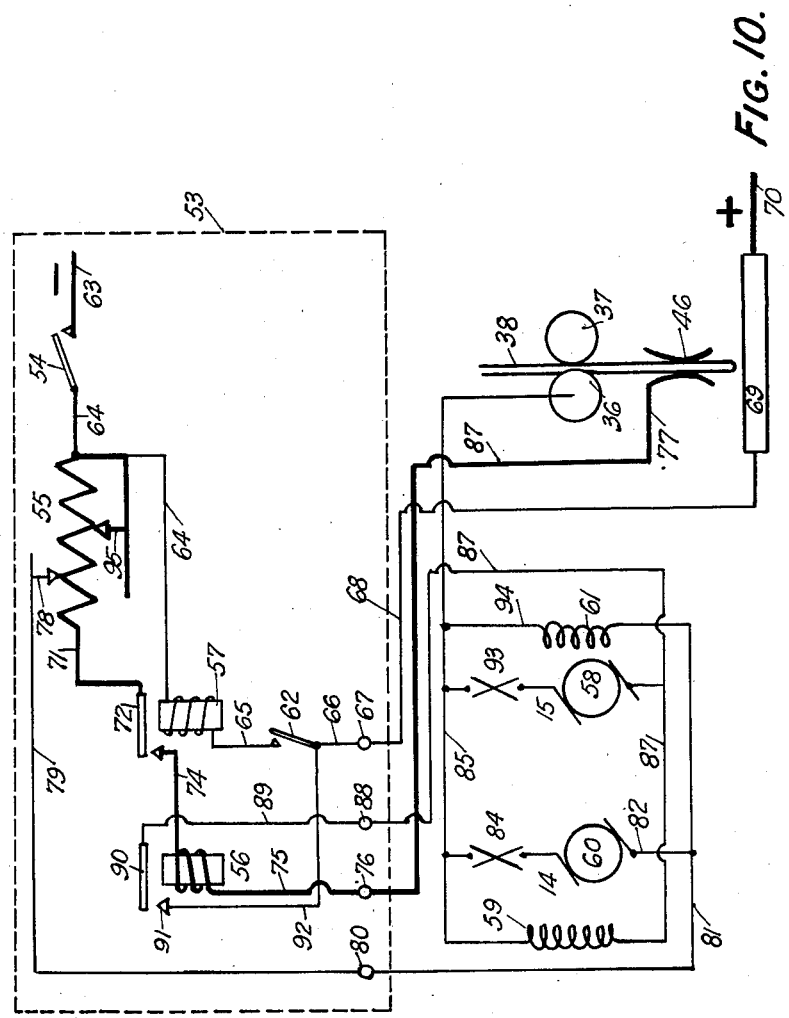

Patented Dec. 1, 1925.

1,563,612

UNITED STATES PATENT OFFICE.

ARTHUR EDWARD CUTLER AND PHILIP ALLAN MARSDEN, OF NEWCASTLE, NEW SOUTH WALES, AUSTRALIA.

ELECTRIC WELDING APPARATUS.

Application filed July 24, 1923. Serial No. 653,590.

*To all whom it may concern:*

Be it known that we, ARTHUR EDWARD CUTLER and PHILIP ALLAN MARSDEN, subjects of the King of Great Britain and Ireland, residents of Newcastle, in the State of New South Wales, Commonwealth of Australia, have invented certain new and useful Improvements in Electric Welding Apparatus (for which we have filed applications in Australia, No. 8,497, filed 18th August, 1922; New Zealand, No. 48,744, filed 30th August, 1922; Great Britain, No. 26,819 filed 4th October, 1922; South Africa, No. 861/22 filed 11th September, 1922), of which the following is a specification.

This invention relates to apparatus for the production of electric arc welds and its object is to maintain an arc of practically constant length by automatically increasing or decreasing the rate of feed of the electrode as the length of arc tends to increase or decrease, and in addition, to so vary the rate of feed as to actually effect a retractive movement of the electrode should same become necessary by reason of the arc becoming too short for effective work with the current supplied.

The apparatus includes a mechanical part which grips and feeds the electrode, and a pair of electric motors, the relative speed of which governs the movement of the electrode either towards or from the work between which and the electrode the arc is struck.

The essential feature of this invention is the employment, in conjunction with a pair of electric motors, of differential gear actuating the feed rollers, the two main elements of said differential gear being themselves driven respectively in opposite directions by the armatures of the motors.

The mechanical part together with the motors may form one unit mounted on wheels and arranged to be progressed by means of gearing from the motors which in this case are installed on or in the same framing or housing. Or the mechanical part may be separate from the motors and connection made by means of flexible or other suitable shafting and electric cables. In this latter case the mechanical part is more of the nature of a tool and is provided with a suitable insulated handle for its manipulation.

When the motors and the mechanical portion are combined as one unit the apparatus would be too weighty for hand manipulation as a whole, and in this case while the apparatus may be stationary, the electrode is led from the feed rollers through a flexible tube terminating in a nozzle provided with an insulating grip and adapted for manipulation by the operator.

Any of the arrangements mentioned or any other which may be suited to particular circumstances, may be employed, as the invention is not confined to either fixed or movable relationship between the motors and the mechanical part.

Fig. 1 is a perspective view of the apparatus complete as a single unit,

Fig. 2 a partial sectional plan thereof,

Fig. 3 a cross sectional elevation of Fig. 2 on a plane disclosing the shaft 27, and Fig. 4 an enlarged view of the differential gearing on the same plane.

Fig. 5 is a detail view of a tensioning device, and

Fig. 6 a sectional detail view of the flexible tube and nozzle for carrying the electrode.

Fig. 7 is a perspective view of a modified form of apparatus wherein the motors (not shown) are remote from the differential gear also on a plane disclosing the shaft 27 and are connected thereto by flexible shafting.

Fig. 8 is a sectional plan of the construction shown in Fig. 7, and

Fig. 9 a sectional elevation of the same.

Fig. 10 is a diagrammatic view of the electrical connections and layout.

Figure 1:
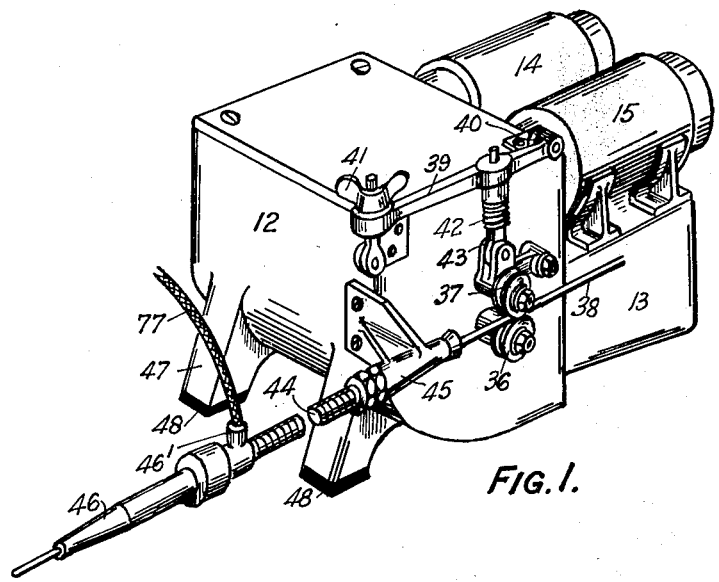
Figure 2:
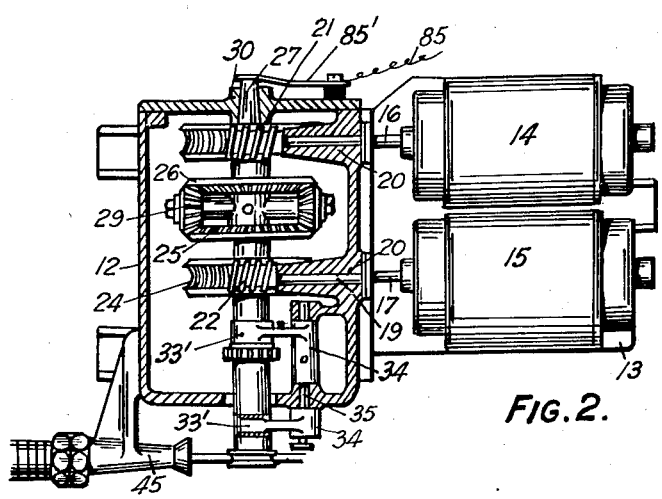

Referring to Figs. 1 to 6 inclusive, the machine comprises a housing 12 having attached thereto but insulated therefrom a platform 13 supporting two electric motors 14 and 15 the respective armature shafts 16 and 17 of which are parallel and are coupled to the extension shafts 18 and 19 but insulated therefrom. The extension shafts 18 and 19 are carried in bearings 20 in the housing 12 and on them respectively are fitted worm gears 21 and 22 which gear with their respective worm wheels 23 and 24. These worm wheels 23 and 24 are rigidly affixed respectively to the bosses of the bevel wheels 25 and 26 which are loosely mounted upon the rotatable shaft 27. Rigidly fastened to the shaft 27 and between the bevel wheels 25 and 26, is a spider 28 on the arms of which are rotatably mounted the planetary pinions 29. The shaft 27 is mounted in bearings 30 in the housing 12 and carries a gear wheel 31 which gears with a gear wheel 32 secured to a rotatable shaft 33 parallel to shaft 27 and mounted in swinging bearings 33¹ formed integrally with brackets 34 mounted on a spindle 35.

On the outer ends of shafts 27 and 33 are fixed a pair of serrated grooved feed rollers 36 and 37 between which is gripped the electrode 38.

For the purpose of regulating the grip of the feed rollers upon the electrode there is provided a tensioning device by manipulation of which shaft 33 may be moved in an arc about the axis of fixed shaft 35 towards or from shaft 27. The movement required is very slight and merely varies without disturbing the depth of the meshing of gears 31 and 32.

The tensioning device comprises a lever 39 fulcrumed on a bracket 40 affixed to the housing 12, said lever bearing upon a spring 42 mounted upon a knuckle 43 coupled to the outer one of said brackets 34. The pressure of the lever 39 on said spring 42 is regulated by a wing nut 41.

The electrode 38 after passing between the feed rollers 36 and 37 passes into a flexible metallic tube 44 attached at one end to a bracket 45, and out through a nozzle 46 attached to the other end of tube 44. The tube 44 and nozzle 46 are insulated, so as to enable the operator to safely handle same.

The housing 12 is provided with a pair of feet 47 with insulated pads 48.

In electrical connection with the nozzle 46 is a socket 46¹ for the plug connection of a main lead 77 hereinafter referred to.

That end of shaft 27 which is remote from the feed roller 36 projects through the housing 12, and upon it bears a spring contact brush 85¹ to which is connected electric lead 85 (hereinafter referred to). Thus feed roller 36 is in electric connection with lead 85 through shaft 27 and spring 85¹.

Assuming each combination of worm, worm wheel and crown wheel to be identical, it will be seen that if the motors 14 and 15 revolve at equal speeds and in opposite sense, no motion will be imparted to the shaft 27 and feed rollers 36 and 37, the planet pinions 29 merely revolving freely on the arms of the spider 28. It will also be seen that if one motor revolves at a higher speed than the other, and in the opposite direction, motion will be imparted to the spider of the differential gear and consequently to shafts 27 and 33 and feed rollers 36 and 37, and the direction of rotation of the shaft 27 will be the same as that of the faster driven worm wheel and crown wheel. Under normal operation, the motors 14 and 15 are arranged to revolve in opposite directions and at such different speeds as to give the feeding rate required to the electrode wire 38 through the feed rollers 36 and 37.

The motor speeds may however vary and it will be seen that with the differential drive, if the normally faster motor becomes the slower one from any cause, that the shaft 27 will revolve in a direction opposite to that which it had before, and accordingly a wire passing through the rollers 36 and 37 will be fed backward.

The motors are so arranged in the electrical circuit, as will be shown later, that such reversals of direction due to causes hereinafter mentioned may be attained.

Referring to Figs. 7, 8 and 9 in which the motors are not shown, it being assumed that they are in remote location and that their armature shafts are respectively connected to the extension shafts 18 of the differential gear by flexible shafts 49; otherwise the differential gearing and feed rollers and tension device are identical as before described (though arranged in slightly different relation) and bear the same reference numerals.

On the housing 12 is an operator's handle 49¹, insulated from the housing 12, and the feed rollers 36 and 37 are contained within said housing, the electrode 38 entering the housing through orifice 50, passing down between the feed rollers 36 and 37 and into a tube 51 contained in the nozzle 46, said electrode making firm sliding contact with said tube, and said nozzle being rigidly affixed to the housing 12. To the nozzle 46 is attached a foot rest 52 insulated from said housing.

The shafts 18 and 19 in this case are coupled to the flexible shafts 49 leading from the armature shafts of the motors but insulated therefrom. The operation of this construction of the apparatus is identical with that hereinbefore described.

Referring to Fig. 10, the panel shown in dotted lines 53 contains the main knife switch 54, adjustable rheostat 55 and two relays 56 and 57 respectively.

It will be seen that armature 58 of motor 15 and field 59 of motor 14 are connected in parallel and that armature 60 of motor 14 and field 61 of motor 15 are also connected in parallel. Also the connections are such that armature 60 of motor 14 is connected across a suitable proportion of the main rheostat 55, whilst its field 59 is connected across the arc; and armature 58 of motor 15 is connected across the arc, whilst its field 61 is connected across a suitable proportion of the main welding rheostat 55. From this it will be seen that the motor 15 will vary its speed if any alteration takes place in the arc length and consequent voltage, due to the fact that arc voltage is impressed upon its armature 58. The speed of this motor will also be varied as its field 61 is connected across the main rheostat 55 as before mentioned the voltage across which will vary inversely with the arc voltage.

The combined effect of the voltages impressed upon both field and armature is such as to cause this motor 15 to speed up or slow down with a greater or less arc voltage, since the armature voltage is increased when the field is weakened or vice versa. The motor 14 will vary its speed due to the fact that its armature is connected across the main welding rheostat, the voltage of which varies inversely as the arc voltage. Again, the speed of this motor 14 will be varied by reason of its field 59 being connected across the arc, and this field will vary its strength with the arc voltage. The combined effect of these voltages is to cause the motor 14 to slow down with a greater arc voltage and to increase its speed if the arc shortens.

The motors 14 and 15 are arranged to revolve in opposite directions, are coupled to the differential gearing before described and are made to revolve at such difference of speed as to give the normal feeding rate to the welding wire (electrode) in the rollers 36 and 37, motor 15 being normally the faster.

Should the arc lengthen an increased voltage will result at that point whilst a reduction of voltage will take place across the rheostat due to the fact that an increased arc voltage means a decreased welding current and consequently decreased voltage drop across the rheostat. The result of this variation in voltages is such as to cause motor 15 to increase its speed and motor 14 to decrease its speed, the change of voltages being impressed upon the windings of the motors as hereinbefore described, thus tending to restore the arc length to normal.

Should the arc shorten and consequently the voltage at this point be reduced, the converse of the above will take place and the speed of the motor 15 will be decreased, whilst that of motor 14 will be increased, this again tending to restore the arc length to normal. From the above description it will be seen that the motors automatically adjust their relative speeds so as to maintain the correct feeding rate.

If from any cause other than the feeding of the wire the arc length be shortened the motors will adjust their speeds to maintain the normal arc length and in some cases this will result in retrograde movement of the electrode.

The working of the apparatus is as follows: The main switch 54 is closed, the electrode 38 placed in contact with the work, the small switch 62 then closed and a circuit made as follows: from negative main 63 (between which and positive main 70 there exists practically constant potential) through switch 54, wire 64, coil of main magnetic contactor or relay 57, wire 65, switch 62, wire 66 to terminal 67, wire 68 to work 69 and positive lead 70. The relay 57 is energized and completes the main circuit as follows: from negative main 63 through switch 54, wire 64, main rheostat 55, wire 71, armature 72 and contact 73, wire 74 coil of series relay 56, wire 75, terminal 76, wire 77, to nozzle 46, electrode wire 38 to work 69 and positive lead 70. Relay 56 is energized and at this stage motor 14 starts to revolve due to the voltage drop over the main rheostat being impressed upon its armature 60, this circuit being as follows: from slider 78 through wire 79 to terminal 80, wire 81, to one terminal 82 of armature 60, through said armature and fuse 84, wire 85, to roller 36, electrode wire 38, nozzle 46, wire 77, coil of relay 56, wire 74, contact 73, armature 72, wire 71, to end of rheostat 55.

The field 59 of motor 14 is slightly magnetized due to the voltage drop at the point of contact of the electrode 38 with the work 69. This circuit is as follows: from electrode 38, roller 36, lead 85, field 59, wire 87, terminal 88, wire 89, armature 90, contact 91, wires 92 and 66, terminal 67, wire 68 to work 69 and positive lead 70.

Motor 15 has little tendency to revolve as its armature 58 only has the low voltage impressed upon it due to the contact of electrode 38 with the work 69; this circuit being: electrode 38, roller 36, wire 85, fuse 93, armature 58, wire 87, terminal 88, wire 89, armature 90, contact 91, wires 92, 66 and 68 to work 69 and positive lead 70.

The field of this motor is fully magnetized due to the voltage drop of the main rheostat 55 being impressed upon it, this field circuit being completed as follows: slider 78, wires 79 and 81, field 61, wires 94 and 85 to roller 36, electrode 38, nozzle 46, main wire 77, coil of relay 56, wire 74, contact 73, armature 72 and wire 71 to end of rheostat 55.

Under the conditions set out above, motor 14, will give the greater torque and will revolve in such a direction as to withdraw the electrode from the work and so establish an arc. As soon as this occurs motor 15 will increase its torque whilst the arc is lengthening and revolve with such a speed and direction as to give the necessary forward and counteracting feed to the electrode.

From now on the motors will so function as to maintain the arc at practically constant length.

The slider 95 is for the purpose of varying the value of the resistance to give various strengths of welding current. Slider 78 is provided for the purpose of varying the value of the voltage applied to armature 60 and field 61 as well as permitting different supply pressures being used.

What we claim and desire to secure by Letters Patent is:—

1. In electric arc welding apparatus a pair of electric motors, the field of one and the armature of the other being connected in parallel across the arc and the armature of the first and the field of the second being also connected in parallel and having impressed thereon a voltage varying directly to any variation in the value of the welding current, means for regulating said voltage, and differential gear actuating electrode feeding rollers, the main elements of said differential gear being respectively driven in opposite directions by said motors.

2. In electric arc welding apparatus a pair of electrode feeding rollers, a shaft carrying one of said rollers, a pair of spaced gear wheels freely mounted on said shaft, a radial arm fixed to said shaft between said gear wheels, a gear pinion mounted on said arm and engaging both said wheels, a pair of electric motors respectively driving said gear wheels in opposite directions, the armature of one of said motors and the field of the other being connected in parallel across the arc, while the field of one and the armature of the other are also connected in parallel and having impressed thereon a voltage varying directly to the value of the welding current, and means for regulating said voltage.

3. In electric arc welding apparatus, electrode feeding mechanism comprising a pair of feed rollers fixed respectively on parallel and mutually geared rotatable shafts one of which is mounted in fixed bearings and the other movable towards or from said fixed shaft, adjustable resilient means pressing said movable shaft towards the other, differential gear comprising a pair of spaced gears mounted to rotate freely on said fixed shaft, a radial arm fixed to said fixed shaft, a pinion mounted to rotate freely thereon and meshing with both of said gear wheels, a pair of electric motors, geared connection between the respective gear wheels and the armature shafts of said motors, the field of one of said motors and the armature of the other being connected in parallel across the arc, and the armature of one and the field of the other also connected in parallel and having impressed thereon a voltage varying directly to the value of the welding current, and an adjustable rheostat for regulating said voltage and the value of the welding current.

Signed at Sydney, New South Wales, this sixteenth day of June A. D. 1923.

ARTHUR EDWARD CUTLER.
PHILIP ALLAN MARSDEN.